United States Patent
Wick et al.

(10) Patent No.: US 9,053,295 B1
(45) Date of Patent: Jun. 9, 2015

(54) FACILITATING APPLICATION DEVELOPMENT USING PROTECTED COMPONENTS

(75) Inventors: Ryan Alan Wick, Apollo Beach, FL (US); Raymond Emilio Reeves, Olathe, KS (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1587 days.

(21) Appl. No.: 12/365,691

(22) Filed: Feb. 4, 2009

(51) Int. Cl.
*G06F 21/00* (2013.01)
*G06F 21/10* (2013.01)
*G06F 9/44* (2006.01)

(52) U.S. Cl.
CPC *G06F 21/10* (2013.01); *G06F 8/70* (2013.01); *G06F 8/20* (2013.01)

(58) Field of Classification Search
CPC .................................................. G06F 21/10
USPC ................................................. 705/52
See application file for complete search history.

(56) References Cited

U.S. PATENT DOCUMENTS

| | | | |
|---|---|---|---|
| 6,272,631 B1* | 8/2001 | Thomlinson et al. | 713/155 |
| 6,981,250 B1* | 12/2005 | Wiltamuth et al. | 717/170 |
| 7,086,046 B2* | 8/2006 | Barsness et al. | 717/152 |
| 8,099,714 B2* | 1/2012 | Ehnebuske et al. | 717/117 |
| 8,108,315 B2* | 1/2012 | Krawetz | 705/59 |
| 2003/0018909 A1* | 1/2003 | Cuomo et al. | 713/200 |
| 2003/0028364 A1* | 2/2003 | Chan et al. | 704/1 |
| 2003/0084325 A1* | 5/2003 | Koved et al. | 713/200 |
| 2003/0159128 A1 | 8/2003 | Kunzler | |
| 2004/0083464 A1* | 4/2004 | Cwalina et al. | 717/141 |
| 2005/0039158 A1* | 2/2005 | Koved et al. | 717/100 |
| 2007/0143223 A1* | 6/2007 | Bhave et al. | 705/59 |
| 2007/0168946 A1* | 7/2007 | Drissi et al. | 717/110 |
| 2008/0127037 A1 | 5/2008 | Kadur et al. | |
| 2008/0168432 A1* | 7/2008 | Ayachitula et al. | 717/158 |
| 2008/0194203 A1 | 8/2008 | Hong | |
| 2010/0005449 A1* | 1/2010 | Karabulut et al. | 717/120 |
| 2010/0011411 A1* | 1/2010 | Bridgham et al. | 726/1 |
| 2010/0095373 A1* | 4/2010 | Levenshteyn et al. | 726/21 |
| 2010/0269094 A1* | 10/2010 | Levenshteyn et al. | 717/109 |

OTHER PUBLICATIONS

First Action Interview Pre-Interview Communication in U.S. Appl. No. 12/253,579, mailed May 23, 2012.
First Action Interview in U.S. Appl. No. 12/253,579, mailed Jul. 16, 2012.

* cited by examiner

*Primary Examiner* — Jacob C. Coppola

(57) ABSTRACT

A method, system, and medium are provided for facilitating development of an application by a user for a mobile communications device. A portion of programmatic code provided by the user is retrieved and a classification corresponding to the code is determined. A set of rules comprising a use restriction associated with a protected application component is referenced to determine whether the code classification corresponds to a use restriction. Incident to identifying an associated use restriction, feedback is presented to the user that indicates that the portion of code corresponds to a use restriction.

20 Claims, 10 Drawing Sheets

FACILITATING APPLICATION DEVELOPMENT USING PROTECTED COMPONENTS

SUMMARY

Embodiments of the invention are defined by the claims below, not this summary. An overview of embodiments of the invention is provided here for that reason.

In a first aspect, a set of computer-executable instructions provides an illustrative method of facilitating development of an application by a user for a mobile communications device. Often, users attempt to use application components such as, for example, application programming interfaces (APIs), methods, functions, parameters, and the like when developing applications. Sometimes the applications components are protected, meaning that the use of the components is restricted. Use restrictions associated with protected components can include any number of rules, conditions, fees, and the like. To provide support information about protected components to a user, embodiments of the illustrative method include receiving a notification of an occurrence of a trigger event and referencing a set of rules that includes a use restriction associated with using a protected component in developing the application. Classification information corresponding to a portion of code is retrieved and subjected to a subset of the set of rules. In an embodiment of the illustrative method, feedback is presented on a display device. The feedback indicates usability information associated with the protected component.

In a second aspect, a set of computer-executable instructions provides another illustrative method of facilitating development of an application by a user for a mobile communications device. According to embodiments of the illustrative method, a portion of code is received and a code classification corresponding to the portion of code is determined. Embodiments of the illustrative method further include referencing a set of rules that include a use restriction associated with using a protected component in developing applications for mobile communications devices. Upon determining that the code classification is associated with the use restriction, an indication that the portion of code is associated with a use restriction is presented.

According to a third aspect, a set of computer-executable instructions provides an illustrative method of facilitating development of an application by a user for a mobile communications device. Embodiments of the illustrative method include authenticating a user, which includes verifying an identification of the user and referencing a user profile associated with the user. Various embodiments further include receiving configuration information provided by the user. A portion of source code is received and a determination is made that the portion of source code corresponds to a first code classification. In an embodiment, the first code classification is associated with a protected application programming interface (API). The illustrative method can also include referencing a set of rules that includes a use restriction based on the configuration information and presenting feedback that indicates that the portion of source code is associated with a protected API.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
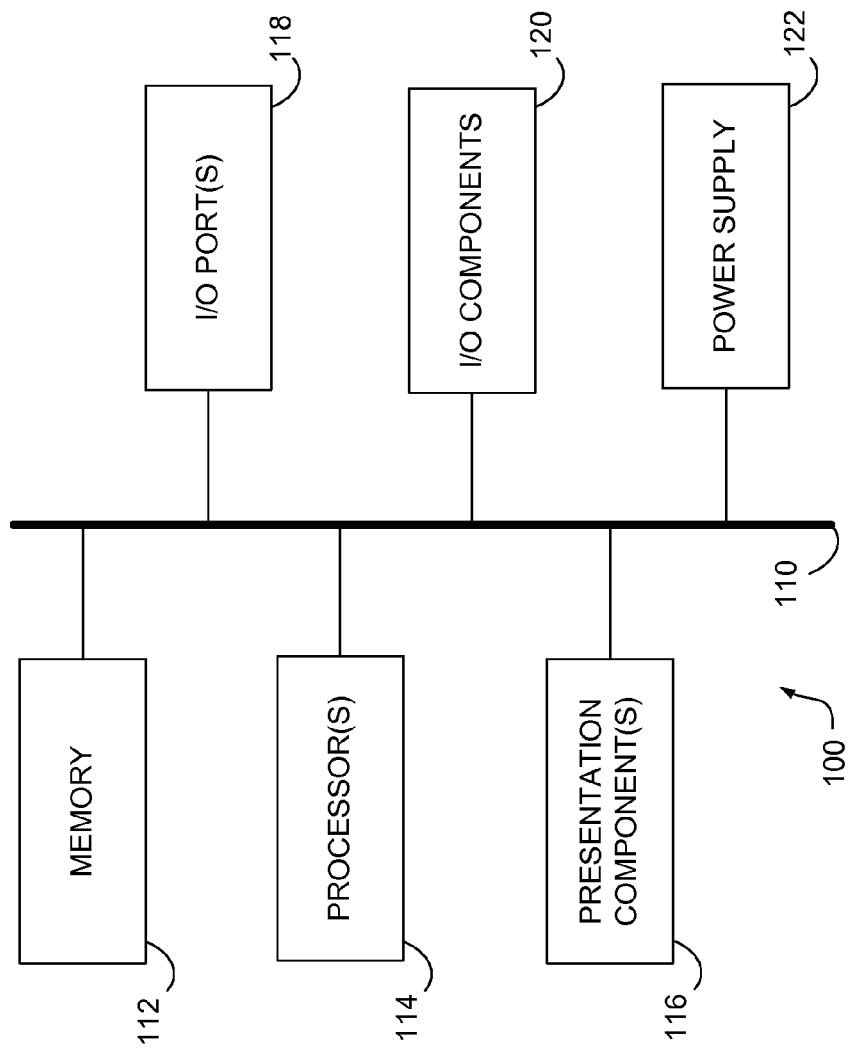
FIG. 1 is a block diagram showing an exemplary computing device in accordance with embodiments of the present invention.

Embodiments of the present invention provide systems and methods for facilitating development of an application by a user for a mobile communications device. By providing feedback regarding the usability of application components such as, for example, application programming interfaces (APIs), methods, and parameters in various devices, embodiments of the present invention facilitate the efficient development of applications for mobile communications devices.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

API Application Programming Interface
CDMA Code Division Multiple Access
CD-ROM Compact Disc Read-Only Memory
CSE Code Search Engine
DVD Digital Versatile Disc EEPROM Electrically Erasable Programmable Read-Only Memory
GSM Global System for Mobile Communications
IDE Integrated Development Environment
I/O Input/Output
IP Internet Protocol
JAR Java Archive
JSR Java Specification Request
LAN Local Access Network
MAC Media Access Control
RAM Random Access Memory
ROM Read-Only Memory
SDK Software Development Kit
TSE Text Search Engine
URL Uniform Resource Locator
WAN Wide Area Network
Wi-Max Worldwide Interoperability for Microwave Access Embodiments of the invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice-input device, touch-input device, touch-screen device, interactive display device, or a mouse.

Figure 2:
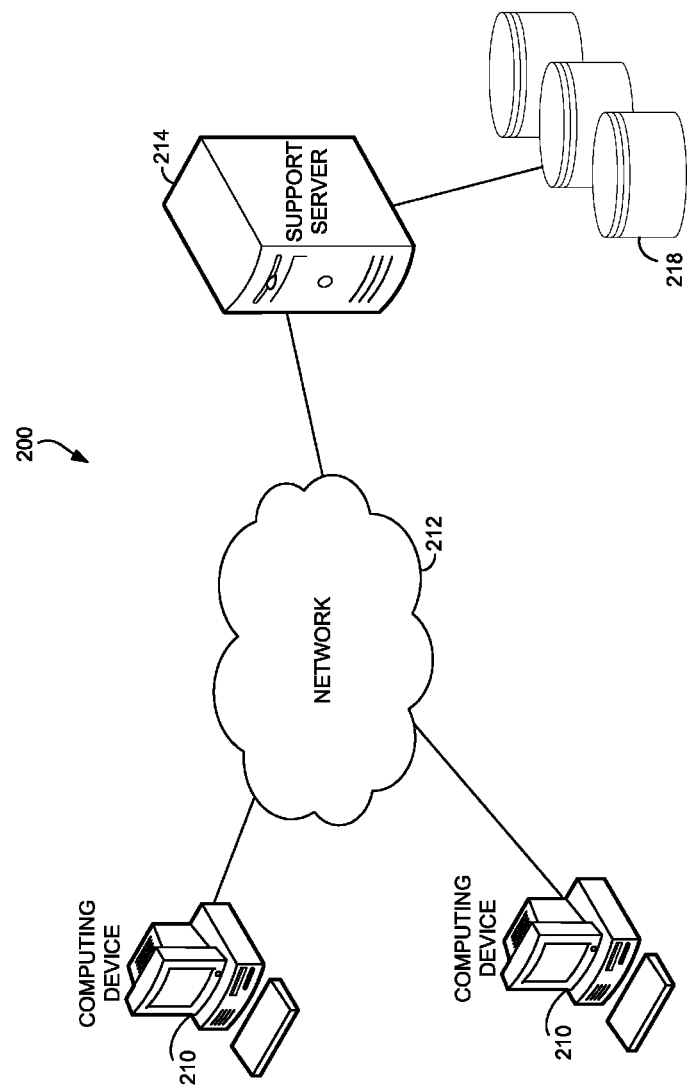
FIG. 2 is a block diagram showing an exemplary network environment suitable for implementing embodiments of the present invention.

Turning to FIG. 2, an exemplary network environment 200 for implementing embodiments of the present invention is shown. Network environment 200 includes computing devices 210 and a support server 214 that communicates with computing devices 210 via network 212. Network 212 can be any kind of suitable network such as, for example, a local area network (LAN), a wide area network (WAN), the Internet, or a combination of networks. Network environment 200 is merely an example of one suitable network environment and is not intended to suggest any limitation as to the scope of use or functionality of the present invention. Neither should network environment 200 be interpreted as having any dependency or requirement related to any single component or combination of components illustrated therein.

Computing devices 210 can be any kind of computing devices that are capable of supporting source-code editing and/or compiling and network communications, according to various embodiments of the present invention. In one embodiment, for example, computing devices 210 are computing devices such as computing device 100, illustrated in FIG. 1.

As illustrated in FIG. 2, computing devices 210 communicate with support server 214. Support server 214 can include any number of various kinds of servers. In an embodiment, support server 214 is a single server, and in another embodiment, support server 214 is a number of servers such as in the case of a server bank. As further illustrated in FIG. 2, support server 214 can communicate with databases 218. According to various embodiments, databases 218 can be located at support server 214, and in other embodiments, databases 218 are maintained separate from support server 214. Databases 218 can be implemented in a single machine or multiple machines and in some embodiments can be maintained in a distributed environment or as a cluster of databases. In other embodiments, databases 218 are all integrated into one database or other type of storage module.

As will be further explained below with reference to FIGS. 3-10, embodiments of the present invention provide for a supportive network environment 200 that users can utilize when developing applications for mobile communications devices. As described above, many of the components that users often include within (or use in conjunction with) applications are protected. Network environment 200 provides a mechanism by which users can obtain up-to-date information regarding protected components. While developing code using computing devices 210, users can be in simultaneous or periodic communication with support server 214, thereby ensuring that the users are working with the most current use restrictions. In some embodiments, computing device 210 maintains a set of rules that includes use restrictions relevant to the user and various characteristics of the application that the user is developing. In embodiments, computing device 210 receives updates from support server 214 as use restrictions are modified, added, deleted, and the like, but analyzes code and references use restrictions locally, as further described below with reference to FIGS. 3 and 4. In other embodiments, computing device 210 communicates with support server 214 throughout a user's development session. During the session, code provided by the user is retrieved, analyzed and classified locally, but the resulting information is provided to support server 214, which subjects the classification information to the set of rules maintained in a location remote from computing device 210, as explained further in FIG. 5. In further embodiments, code provided by the user can be retrieved, analyzed, and classified by support server 214.

Figure 3:
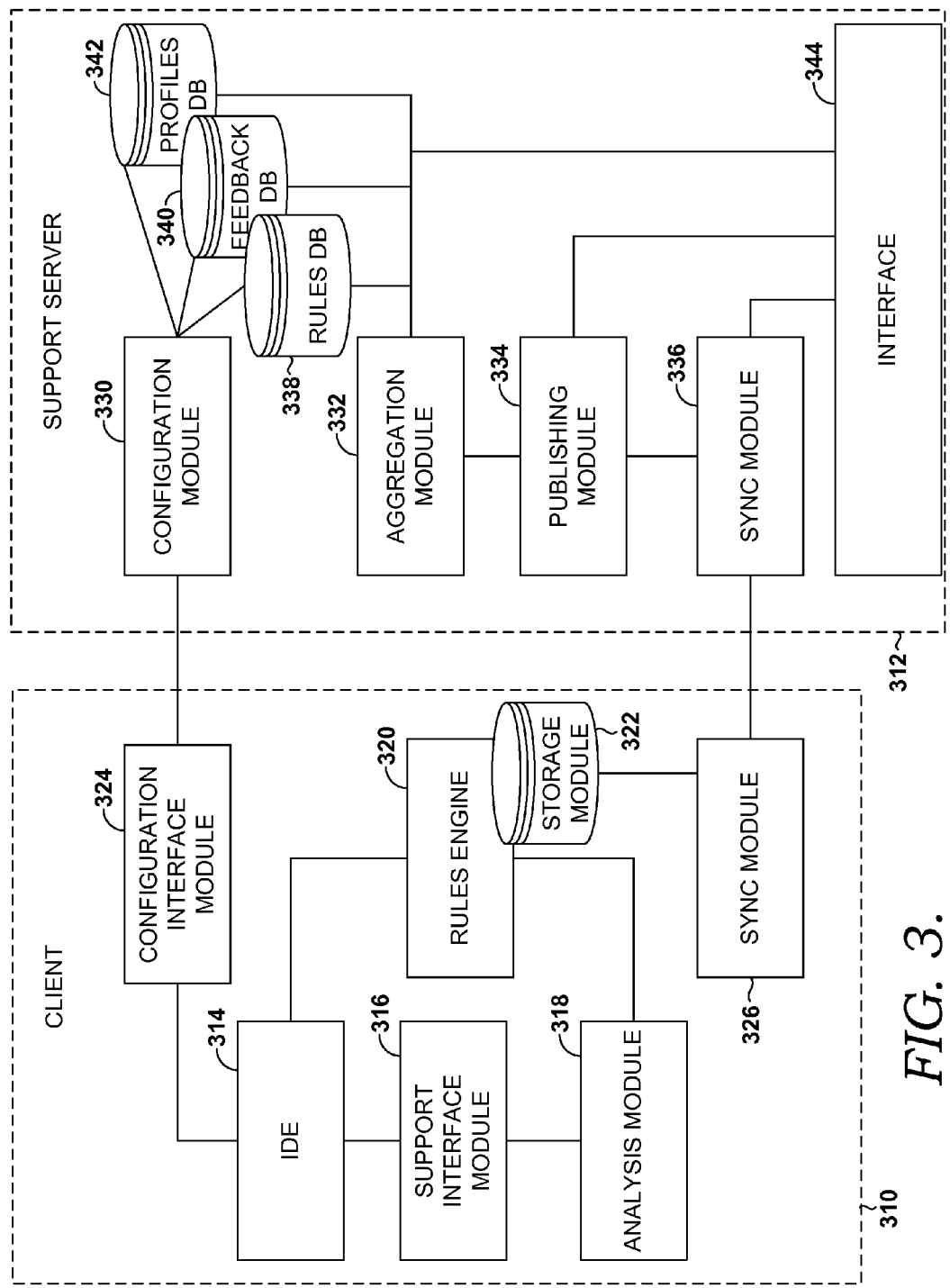
FIG. 3 is a block diagram showing a more detailed illustration of an exemplary network environment suitable for implementing embodiments of the present invention.

Turning now to FIG. 3, a more detailed illustration of an exemplary network environment 300 according to embodiments of the present invention is shown. Network environment 300 includes a client 310 and a support server 312. According to various embodiments, client 310 can be located on a computing device such as computing device 100 discussed above in FIG. 1. Similarly, in embodiments, client 310 can be located on a computing device such as computing device 210 illustrated in FIG. 2. As the term is used herein, client 310 includes software, hardware, and other modules and/or components necessary to provide the various types of functionality described herein with respect to the various embodiments of the present invention.

According to some embodiments and as illustrated in FIG. 3, client 310 includes an integrated development environment (IDE) 314, a support interface module 316, an analysis module 318, a rules engine 320, a storage module 322, a configuration interface module 324, and a sync module 326. In some embodiments, any one or more of support interface module 316, analysis module 318, rules engine 320, and storage module 322 can be located on support server 312, client 310, or some other device not illustrated in FIG. 3. In further embodiments, any of the modules 316, 318, 320, and 322 can be distributed in any number of various manners across multiple devices or networks. Additionally, in embodiments, any two or more of modules 316, 318, 320, and 322 can be combined within a single module, component, device, or the like.

IDE 314 can include a number of software development tools such as, for example, a source-code editor, a compiler, an interpreter, a build automation tool, a debugger, a version control system, an object inspector, a class browser, a class hierarchy diagram, and the like. IDE 314 can support various programming languages such as, for example, Java.

In an embodiment, IDE 314 is a stand-alone application or package of applications. In another embodiment, IDE 314 is integrated or combined with other applications or features in a software development kit (SDK). In other embodiments, IDE 314 is used in parallel with an SDK with which IDE 314 can communicate. In embodiments, an SDK can include, for example, IDE 314, sample code, and other supporting documentation. Exemplary SDKs include Sprint Wireless Toolkit, available from Sprint Nextel of Overland Park, Kans.; Java SDK from Sun Microsystems of Santa Clara, Calif.; and Microsoft Platform SDK from Microsoft Corporation of Redmond, Wash.

Support interface module 316 functions as a communication interface between IDE 314 and other components of the network environment 300. For example, in embodiments, support interface module 316 extracts programmatic code from IDE 314 so that the code can be analyzed and classified. In various embodiments, support interface module 316 extracts code from IDE 314 by copying portions of code, requesting copies of code, taking snapshots of code, maintaining references to code as it is being input, or any other method sufficient for retrieving programmatic code from IDE 314. In embodiments, support interface module 316 also formats feedback information and other information so that the information can be displayed or otherwise presented to a user by IDE 314. In various embodiments, support interface module 316 receives feedback information regarding use restrictions associated with application components and code classifications corresponding to code retrieved from IDE 314. The feedback information is referred to throughout the following discussion as use-restriction indications and/or usability reports. In an embodiment, support interface module 316 facilitates the display of, and user interaction with, use-restriction indications and/or usability reports. Support interface module 316 can also include functionality that enables a user to communicate with various components of network environment 300 by way of inputting information via IDE 314.

In some embodiments, support interface module 316 monitors user activities related to development of applications by retrieving data from IDE 314. In an embodiment, support interface module 316 is adapted to detect occurrences of trigger events. Upon detection of occurrence of a trigger event, support interface module 316 performs tasks necessary to implement functionality provided by other components illustrated in FIG. 3. For example, in one embodiment, upon detecting the occurrence of a trigger event, support interface module 316 begins extracting portions of programmatic code (e.g., source code, compiled code, etc.). In embodiments, information associated with the trigger event can be processed by support interface module 316 and different types of information can correspond to instructions for extracting different types or amounts of code.

For example, in an embodiment, upon completing the input of source code for an application, a user may select an option for initiating a session for checking the usability of various application components. The selection of that option may be a trigger event that causes support interface module 316 to extract the entire body of source code that was provided by the user. As another example, support interface module 316 can be configured to begin extracting portions of code as it is being provided by the user. In some embodiments, a trigger event that causes this behavior can include authentication with support service 212 (e.g., when a user signs in to support service 212, support interface module 316 receives a notification of the sign-in and begins monitoring for the input of code to extract), certain keystrokes, and the like. In some embodiments, support interface module 316 can be configured to extract code upon detecting the entry of code that may be associated with a protected component. That is, support interface module 316 may monitor the keystrokes that are provided by a user, and upon detection of a keystroke that corresponds to the completion of a portion of source code that appears to define a function call, method, parameter, or the like, support interface module 316 can compare that code to a known list of protected components to determine whether the code might constitute an attempt to invoke one or more of the components. In another embodiment, support interface module 316 extracts a portion of programmatic code every time a predetermined amount of code (e.g., measured by lines, functions, etc.) is written. According to another embodiment, a user can manually invoke support interface module 316 and thus extract programmatic code only when the user desires. In other embodiments, support interface module 316 can be adapted to extract code periodically, continuously, or according to any other rule or condition that is defined for its operation.

In embodiments, support interface module 316 can be a program module, an application, an application programming interface (API), or any other type of software component suitable for facilitating the types of communications between IDE 314 and various other components that may form part of an implementation of the present invention. In some embodiments, support interface module 316 can be integrated with IDE 314. In other embodiments, support interface module 316 can be integrated with analysis module 318, rules engine 320, configuration interface module 324, and/or sync module 326. In some embodiments, any number of those modules 316, 318, 320, 324, and 326 can be integrated or combined in any number of fashions. For example, in one embodiment, all of the modules 316, 318, 320, 324, and 326 can be combined with IDE 314 to form part of an SDK. In other embodiments, any number of modules 316, 318, 320, 324, 326, and 328 can be implemented as plug-ins, application extensions, stand-alone applications, or the like.

Analysis module 318 receives and analyzes programmatic code extracted by support analysis module 316. In embodiments, the programmatic code extracted or otherwise retrieved from IDE 314 is source code provided by a user. In other embodiments, the programmatic code can be compiled code, intermediate language code, native machine code, Unicode, and the like. In an embodiment, analysis module 318 includes modules such as, for example, support interface module 316, for extracting programmatic code from IDE 314.

In an embodiment, analysis module 318 includes an API that facilitates the operations described below. In another embodiment, analysis module 318 is a stand-alone program that interfaces (e.g., using APIs) with IDE 314, in some cases, through support interface module 316. In some embodiments, analysis module 318 is a plug-in feature that can be used to upgrade the functionality of IDE 314. In further embodiments, analysis module 318 is a component integrated with, or contained within, IDE 314. In other embodiments, analysis module 318 resides on support server 312 and interfaces with various components of client 310.

In an embodiment, analysis module 318 is configured to inspect programmatic code and determine corresponding code classifications, which include code classes, groups of code classes, interfaces (e.g., APIs), exceptions, packages, and the like. For example, Java code can be classified by JSRs, which are groups of code classes. More granular analysis can determine, for example, classes within a JSR that correspond to the code. Further analysis can be utilized to determine particular programming interfaces such as APIs that correspond to the code in addition to methods, function calls, parameters, and the like.

In an embodiment, analysis module 318 includes parsing technology that parses programmatic code. Analysis module 318 can also perform key word searches on parsed or unparsed code to identify key words associated with code classifications. In this manner, analysis module 318 can determine code classifications that correspond to programmatic code. According to another embodiment of the present invention, code classifications corresponding to the programmatic code are identified by using a text search engine (TSE), which performs a simple text search on the code. The TSE can take as input one or more clear text files such as (*.java) files and output a listing of classes, interfaces, exceptions, and packages that correspond to the analyzed source code. A more granular analysis can be performed by using a more complex search algorithm based on the hierarchies of code classifications. In another embodiment of the invention, compiled Java code is searched using a Java application code search engine (CSE), which can analyze the structure and content of compiled Java code. The CSE can take as input one or more Java Archive (JAR) files that represent a Java application. The output of the CSE can include a list of classes, interfaces, exceptions, and packages corresponding to the compiled code. In other embodiments, IDE 314 can include text-reading technology that is capable of recognizing text and/or code classifications.

As indicated above, one example of a programming language that is supported by embodiments of the present invention is the Java programming language. For the purposes of illustration, and not to so limit the scope of the present invention, there follows several examples of key words and their corresponding groups of code classifications. For example, analysis module 318 might determine that the programmatic code corresponds to one of the following classes: AddressInfo, Coordinates, Criteria, Landmark, LandmarkStore, Location, LocationProvider, Orientation, or QualifiedCoordinates. Similarly, analysis module 318 might make determinations based on identification in the code of corresponding interfaces (e.g., LocationListener, ProximityListener), exceptions (e.g., LandmarkException, LocationException), or packages (e.g., javax.microedition.location). Similar identifications can be made of particular function calls, methods, and parameters corresponding to interfaces and exceptions. For brevity, portions of code, interfaces, packages, libraries, and the like are referred to herein as application components. Application components can be combined with (e.g., incorporated pursuant to a function call) source code to create an application. The source code itself can also be referred to as an application component.

As explained above, some application components are protected. That is, some application components have corresponding use restrictions. For example, in some cases, a particular function call, API, method, or parameter may be protected as property such that if a user wants to incorporate the component into an application that the user is developing, the user must obtain permission from the owner of the component to do so. In embodiments, obtaining permission can include receiving a written authorization, paying a fee, and the like. According to embodiments of the invention, components can be protected in other ways as well. For example, a protected component can be one that requires a license to use, or that requires payment of one or more fees. Other protected components can include components that, when used to create an application, result in a cost to the consumer upon execution of the application by the consumer. For example, when an application that is created with a protected component is used by a consumer on a mobile device, the consumer might incur a one-time cost that may be built into the price of the application or a related service. In other situations, such an application can result in increased transaction fees for a consumer. In other cases, protected components might be available for use for only a limited time, or for a certain number of times. Other restrictions on components can include restrictions on the types of networks with which the component can be used, the particular service provider or application provider with which the application is to be associated, the types of mobile devices on which the application will be used, and the like.

By identifying the types of application components a user attempts to use during creation of an application for a mobile device, analysis module 318 provides the information necessary for rules engine 320 to determine whether a user is attempting to use protected application components. According to embodiments of the present invention, code classifications that are determined by analysis module 318 are provided to rules engine 320 as classification information. In some embodiments, the portions of code analyzed by analysis module 318 are also provided to rules engine 320. In other embodiments, data representing output of a code parsing process can be provided to rules engine 320. Additionally, in embodiments, one or more of the modules 314, 316, 318, and 320 maintains information that associates the code classifications determined by analysis module 318 with the portions of code retrieved from IDE 314. The association information can contain references, pointers, links, or the like to the locations in the programmatic code hosted by IDE 314 from which the portions of code are extracted. Rules engine 320 can return feedback that can be visually presented by IDE 314 in a manner that draws attention to the portions of code that correspond to protected components.

With continued reference to FIG. 3, rules engine 320 receives classification information (e.g., code classifications such as identifications of APIs, methods, calls, exceptions, and the like) from analysis module 318. Rules engine 320 references data housed in storage module 322. According to embodiments, storage module 322 can include a rules store and a feedback store. Storage module 322 can be a database, a portion of memory, a folder, or any other type of logical storage construct capable of maintaining information that is accessible by rules engine 320. According to various embodiments of the present invention, storage module 322 includes mappings between code classifications and sets of rules. The sets of rules include use restrictions associated with protected application components. Use restrictions can be maintained in storage module 322 as rules, conditions, descriptive information, functions, program modules, and other types of data.

According to some embodiments, storage module 322 includes a database that has mappings between code classifications and corresponding use restrictions. In some embodiments, the database is a relational database, wherein use restrictions can be characterized by attributes. In other embodiments, the database can include a table containing basic mappings between identifiers representing code classifications and use restrictions. In still further embodiments, storage module 322 includes numerous levels of detail available for each use restriction referenced therein. Any number of levels of granularity can be built into storage module 322, and particular configurations thereof depend upon the requirements of the implementations of embodiments of the present invention.

Rules engine 320 references a set of rules maintained in storage module 322 to determine whether the code classifications determined by analysis module 318 correspond to any use restrictions. If the code classifications do correspond to a use restriction or restrictions, rules engine 320 can retrieve additional information about the use restrictions. Referencing a set of rules maintained at storage module 322 can include various actions such as making a function call to a module associated with the information in storage module 322, querying a database stored at storage module 322, retrieving data from a data store maintained at storage module 322, or the like. Incident to a determination that a code classification determined by analysis module 318 corresponds to a protected component, feedback information is retrieved by rules engine 320.

Feedback information can include a wide variety of types of information and many different levels of detail. According to embodiments of the present invention, feedback information includes information necessary for the support interface module 316 to render visual indications on a display device such as, for example, alterations (e.g., color changes, underlined text, flashing text, highlighted text, and the like) to the displayed code, visual markers displayed adjacent to portions of the code displayed in IDE 314, and the like. In some embodiments, feedback information can be presented in the form of a usability report that is presented on a screen that is separate from the screen on which the code that the user is providing is displayed. In various embodiments, feedback information can include information about the types of use restrictions that are associated with the identified protected components, information about consequences of using the protected components without satisfying the use restrictions, and the like.

As further illustrated in FIG. 3, support server 312 includes a configuration module 330, an aggregation module 332, a publishing module 334, a sync module 336, a set of storage modules 338, 340, and 342, and an interface 344. Support server 312 is merely an example of one suitable support server and is not intended to suggest any limitation as to the scope of use or functionality of the present invention. Neither should support server 312 be interpreted as having any dependency or requirement related to any single component or combination of components illustrated therein. For example, in some embodiments, any number of the components illustrated in FIG. 3 can be integrated as a single component, divided into many more components, or arranged in any number of alternative configurations.

Configuration module 330 communicates with configuration interface module 324, which is located on client 310. Configuration module 330 assists in the establishment, maintenance, storage, recall, and alteration of configuration settings associated with user sessions corresponding to the support service described throughout the present disclosure. For example, according to various embodiments of the present invention, software developers (referred to herein as "users") can sign up for an account with, or subscribe to services from, a support service associated with support server 312. Upon establishing an account, configuration information can be obtained from the user and stored in a user profile associated with the user. As illustrated in FIG. 3, user profiles can be maintained in a profiles database 342 and can include any type of information desirable. For example, a user profile can include the user's name, address, billing information, payment method information, affiliations (e.g., employer, union, memberships, and the like), preferences, and the like. This and other information can be provided by the user by way of communication between the configuration module 330 and the configuration interface module 324.

In some embodiments, configuration module 330 can provide a user interface that is adapted to allow a user to enter or select various types of configuration information. In an embodiment, configuration module 330 can accept user-provided information regarding identifications of the types of technology that the user intends to target with applications that the user is developing (e.g., the types of technology on which the user intends the application to be utilized). For example, the user can provide identifications of target devices, target network carriers, target networks, target network providers, target application hosts, target modes of distribution, target geographical regions, and the like. In some embodiments, use restrictions associated with protected components may be based on configuration information such as targeted technology and entities, as well as on any number of various characteristics associated with the user such as, for example, the user's employer, the existence of contracts that the user has signed, permissions granted to the user according to the type of account the user has established, fees the user has paid, the user's geographic location, and the like. Accordingly, in some embodiments, configuration module 330 can be accessed by the user at any time such as, for example, before the user begins creating an application, when the user signs up for an account, and the like.

In embodiments, configuration module 330 is also adapted to manage authentication processes such as, for example, by providing an interface by which a user can enter a login name and a password. When authenticating a user, configuration module 330 verifies an identification of the user (e.g., the user's identity), and can reference the user's profile for verifying login information and the like. Additionally, in some embodiments, configuration module 330 can be adapted to automatically provide a user interface, message, or other communication to client 310 incident to receiving a communication from client 310 indicating that a trigger event has occurred.

As further illustrated in FIG. 3, configuration module 330 can access a rules database 338 and a feedback database 340. Rules database 338 and feedback database 340 can be implemented in any number of arrangements. For instance, rules database 338 and feedback database 340 can be implemented on a single machine, on multiple machines, or can be distributed throughout a database cluster. In other embodiments, rules database 338 and feedback database 340 can be integrated as a single database, and in further embodiments, rules database 338, feedback database 340, and profiles database 342 can all be integrated into a single database such as, for example, a relational database. In further embodiments, any number of other potential arrangements and combinations of storage modules and databases are possible, and are considered to be within the ambit of the present invention.

Rules database 338 includes one or more sets of rules that include use restrictions associated with protected components. Use restrictions can include any type of rule, condition, restriction, limitation, or the like that is associated with a protected application component. For instance, some protected components can include use restrictions that limit the amount of time the component can be used by a particular user, by a user associated with a particular employer, or by any user. In other embodiments, use restrictions can include fees required to be paid in exchange for the ability and/or permission to use a component. In still other embodiments, use restrictions can include indications that, when utilized as part of a compiled and executed application by a consumer, the use of a protected component can result in the consumer incurring a cost such as, for example, a transaction cost. In further embodiments, use restrictions can include requirements to obtain permission from a network operator or service provider to use a protected component. In still further embodiments, use restrictions can include limitations to the types of devices, networks, modes of implementation, and the like that can be associated with a protected component. The above listing of examples of use restrictions are not intended to be exhaustive, and it should be understood that any type of limitation, restriction, requirement, condition, and the like can be imposed upon the use of an application component within the context of embodiments of the present invention.

With continued reference to FIG. 3, feedback database 340 includes feedback information that can be provided to users. According to embodiments of the present invention, feedback information can include information that can be used to provide indications that portions of code correspond to protected components. Feedback information can also include information about use restrictions such as, for example, explanations of use restrictions, instructions for satisfying use restrictions (e.g., instructions for taking the steps necessary to be able to use a protected component), documents, links, references, pointers, and the like. For example, in some embodiments, feedback information can include an explanation of a use restriction that indicates that the user must complete an application to obtain permission to use a protected component. The feedback information may also contain a copy of the application or a link to the application so that the user can obtain the application and any other necessary documents without leaving the network environment 300. In other embodiments, feedback information can include the data and instructions necessary to render images, visual indications, text alterations and the like on a display screen associated with an IDE.

In further embodiments, feedback information can include usability reports associated with protected components. A usability report can include information about the protected component and any use restrictions corresponding thereto. Additionally, usability reports can include information about alternative components that a user may consider, as well as instructions, documents, links, and the like that may be necessary for a user to satisfy a use restriction such that the user can use the protected component in the creation of an application. The examples of information listed above are illustrative of the type of information that can be included in a usability report, and it should be understood that any other type of relevant information can be included as well, according to various embodiments of the present invention.

Configuration module 330 receives configuration information from a user and utilizes that information to provide appropriate support information to the user. According to embodiments of the present invention, configuration module 330 references configuration information, which can be referenced as it is received from a user or from a user profile maintained in profiles database 342, to determine the protected components and particular types of use restrictions that a user may be subject to. Using this information, configuration module 330 retrieves a set of rules from rules database 338 and corresponding feedback information from feedback database 340. Configuration module 330 provides the set of rules and feedback information to aggregation module 332, which packages the rules and feedback and any other necessary, desirable, or helpful information for the user. Publishing module 334 retrieves the packaged information from aggregation module 332 and renders it in a form suitable for transmission to client 310. In embodiments, publishing module 334 can be adapted to maintain or retrieve data regarding communication capabilities associated with client 310, storage capabilities associated with client 310, and operating system requirements and characteristics associated with client 310. Using this information, publishing module 334 can configure the aggregated (i.e., packaged) information such that client 310 can use, access, or render the information.

As further illustrated in FIG. 3, sync module 336 communicates with publishing module 334 and with sync module 326. The two sync modules 326 and 336 work together to ensure that use restriction information and corresponding feedback information stored or cached at client 310 is current. In some embodiments, sync module 326 communicates periodically with sync module 336 to determine whether an update is required. In other embodiments, the sync modules 326 and 336 may continuously communicate such that necessary information can be retrieved by client 310 from support server 312 as it is needed, thereby requiring less information to be stored at client 310. In further embodiments, the sync modules 326 and 336 can be instructed to communicate in response to instructions provided by the user or network operator. Any number of other communication arrangements can be used as well, according to various implementations of the present invention.

Also illustrated in FIG. 3 is an interface 344 situated at support server 312. Interface 344 can be a software module, hardware device, API, or any combination of hardware and software that allows a network operator to update information and functionality associated with support server 312. For example, as new contracts are executed, a network service provider may establish new use restrictions corresponding to application components and may modify existing use restrictions. These updates and modifications can be achieved by way of interaction with interface 344. In some embodiments, a human network operator can interact with interface 344 to affect changes in the databases 338, 340, 342 or software modules 330, 332, 334, and 336. In other embodiments, applications, APIs, or other computer-implemented processes can be configured to interact with support server 312 by way of interface 344. In an embodiment, incident to an update to information in one or more of the databases 338, 340, or 342, interface 344 can cause sync module 336 to communicate the updated information to client 310 via sync module 326.

Figure 4:
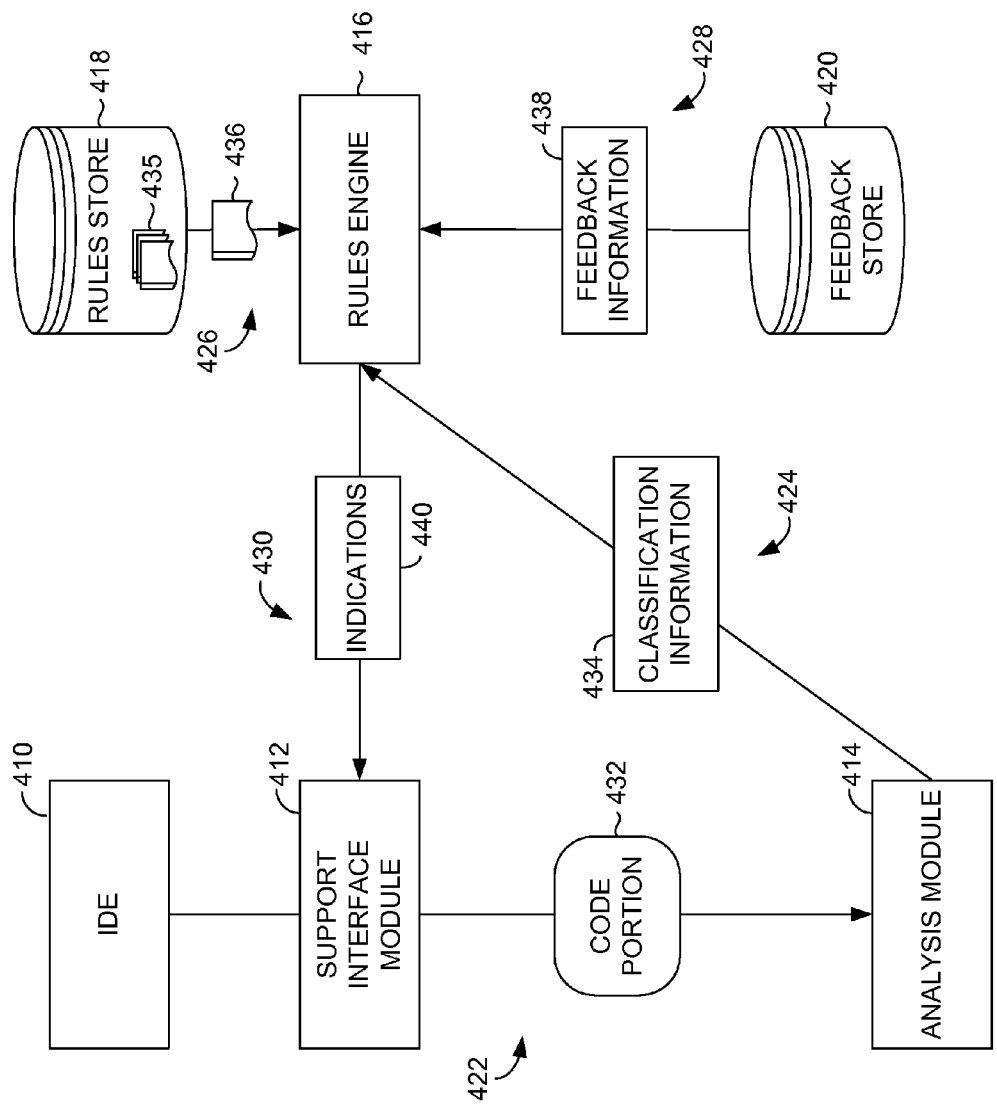
FIG. 4 is a schematic diagram showing an exemplary implementation of an embodiment of the present invention.

Turning now to FIG. 4, a schematic diagram illustrates an exemplary implementation of an embodiment of the present invention. As shown therein, the embodiment implemented in FIG. 4 includes IDE 410, support interface module 412, analysis module 414, rules engine 416, rules store 418, and feedback store 420. In an embodiment, all of these components are maintained within a user's computing device. In another embodiment, IDE 410, support interface module 412, and analysis module 414 are maintained on the user's computing device whereas rules engine 416, rules store 418 and feedback store 420 reside on a support server. In other embodiments, various alternative combinations of the above can be implemented.

As illustrated in FIG. 4, at 422, programmatic code (illustrated as "code portion") 432 such as, for example, a source-code portion, is extracted from IDE 410 by support interface module 412 and provided to analysis module 414. In an embodiment, an entire set of programmatic code such as the source code for an application or a compiled code set, can be extracted and provided to analysis module 414. In other embodiments, a character string, a line of code, a page of code, or the like can be extracted and provided to analysis module 414. After determining code classifications that correspond to code portion 432, as well as other information regarding the code and the code classifications, analysis module 414 provides classification information 434 to rules engine 416, as illustrated at 424. As shown at 426, rules engine 416 references a set of rules 435 maintained by rules store 418. In one embodiment, rules engine 416 performs a basic lookup operation in rules store 418 to compare the determined code classification information 434 with a mapping of use restrictions to code classifications. In another embodiment, rules engine 416 can query a database maintained at rules store 418 for various granularities of information about use restrictions corresponding to the code classifications. Rules engine 416 references the set of rules 435 to identify a subset 436 of the set of rules 435 in rules store 418, which includes use restriction information corresponding to the code classifications included in classification information 434. The use restrictions may also pertain to, for example, particular mobile communications devices, code classes, user configurations, and the like. The subset 436 of rules is returned to rules engine 416, as shown at 426. As the term is used herein and throughout the present disclosure, a subset can be an improper subset (i.e., the entire set) or a proper subset (i.e., less than the entire set).

As shown at 428, rules engine 416 receives feedback information 438 from feedback store 420. For example, in one embodiment, feedback store 420 provides use-restriction information and use-restriction indications and/or use-restriction reports, any one or more of which constitutes feedback information 438. Rules engine 416 prepares feedback information 438 for presentation by IDE 410. Presentation can include, for example, rendering indications on a display device. In some embodiments, rules engine 4169 uses feedback information 438 to generate indications 440 such as, for example, alerts, notifications, and the like, which are provided to IDE 410 for presentation to a user as shown at 430. In an example, indications 440 comprise visual indicators that are used to inform the user as to whether a particular code portion corresponds to a protected component.

Figure 5:
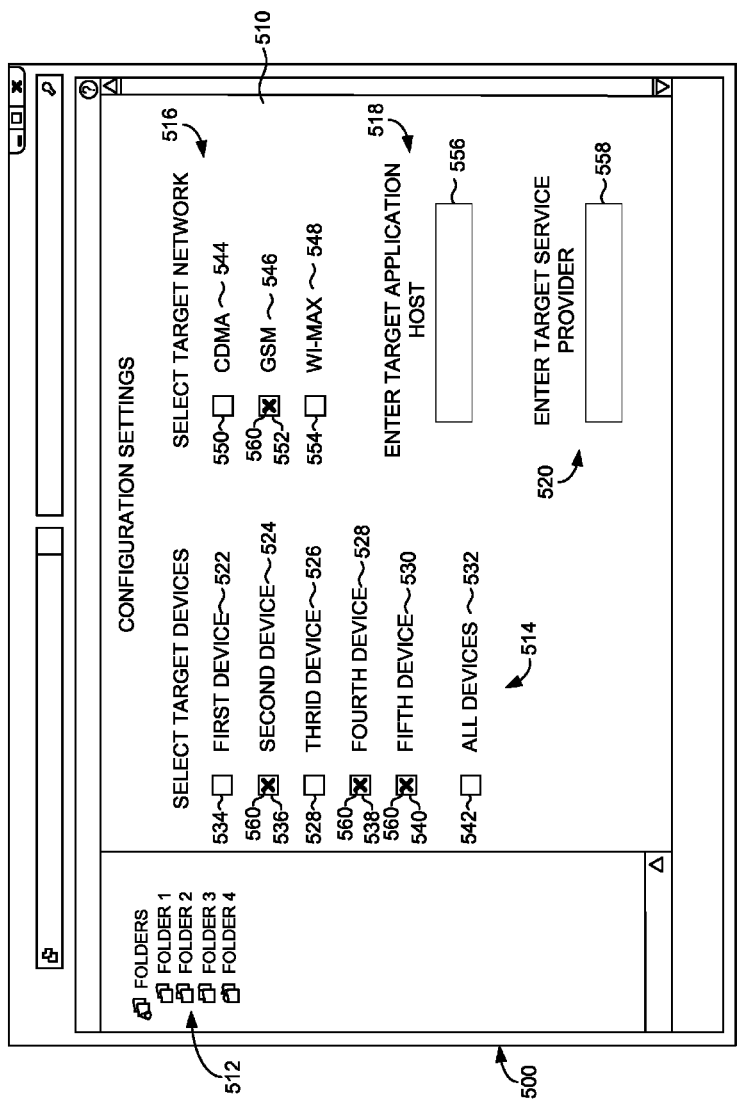
FIG. 5 is a screen shot showing an exemplary configuration user interface in accordance with embodiments of the present invention.
Figure 6:
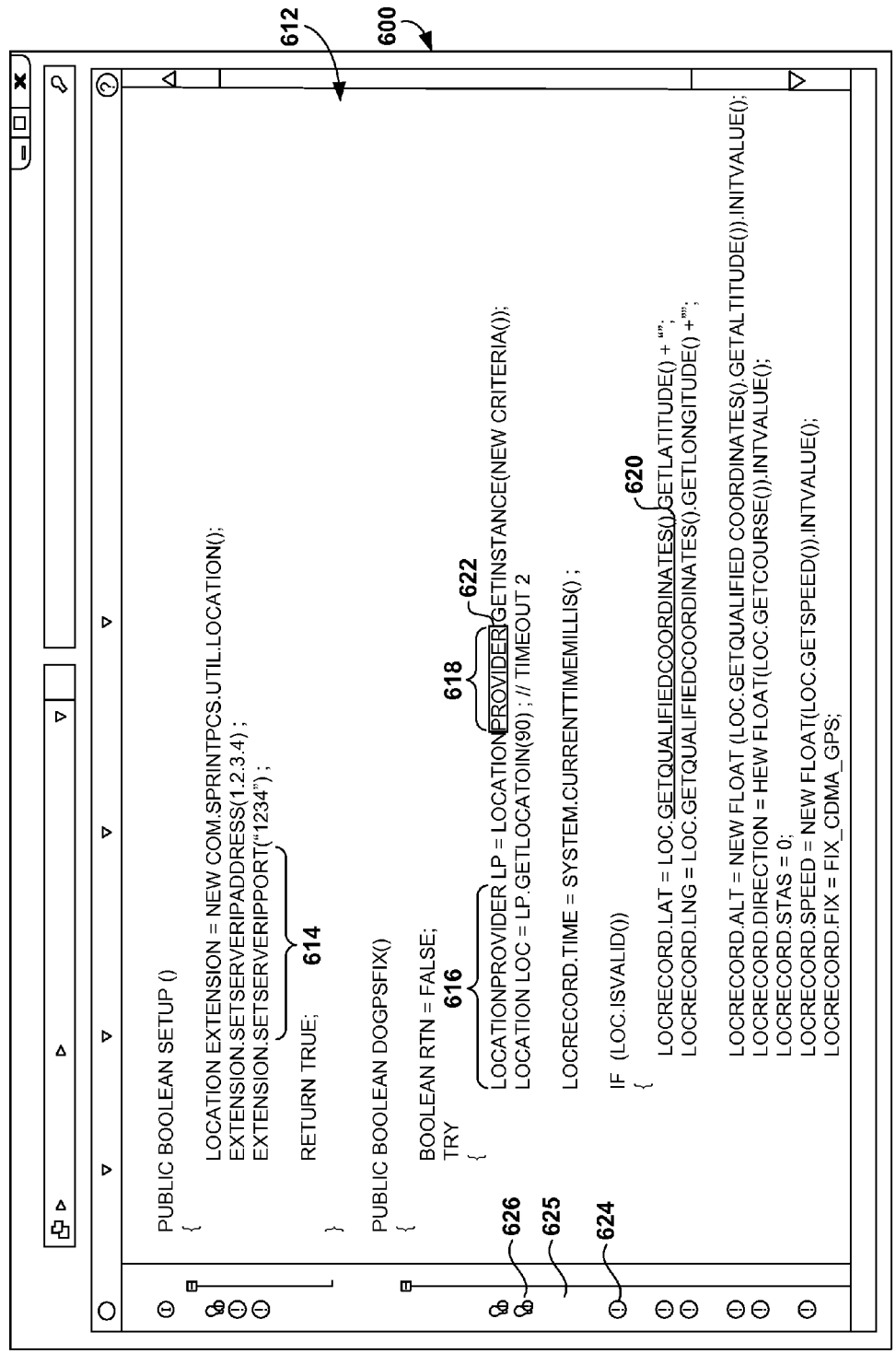
FIG. 6 is another screen shot showing an exemplary integrated development environment in accordance with embodiments of the present invention.
Figure 7:
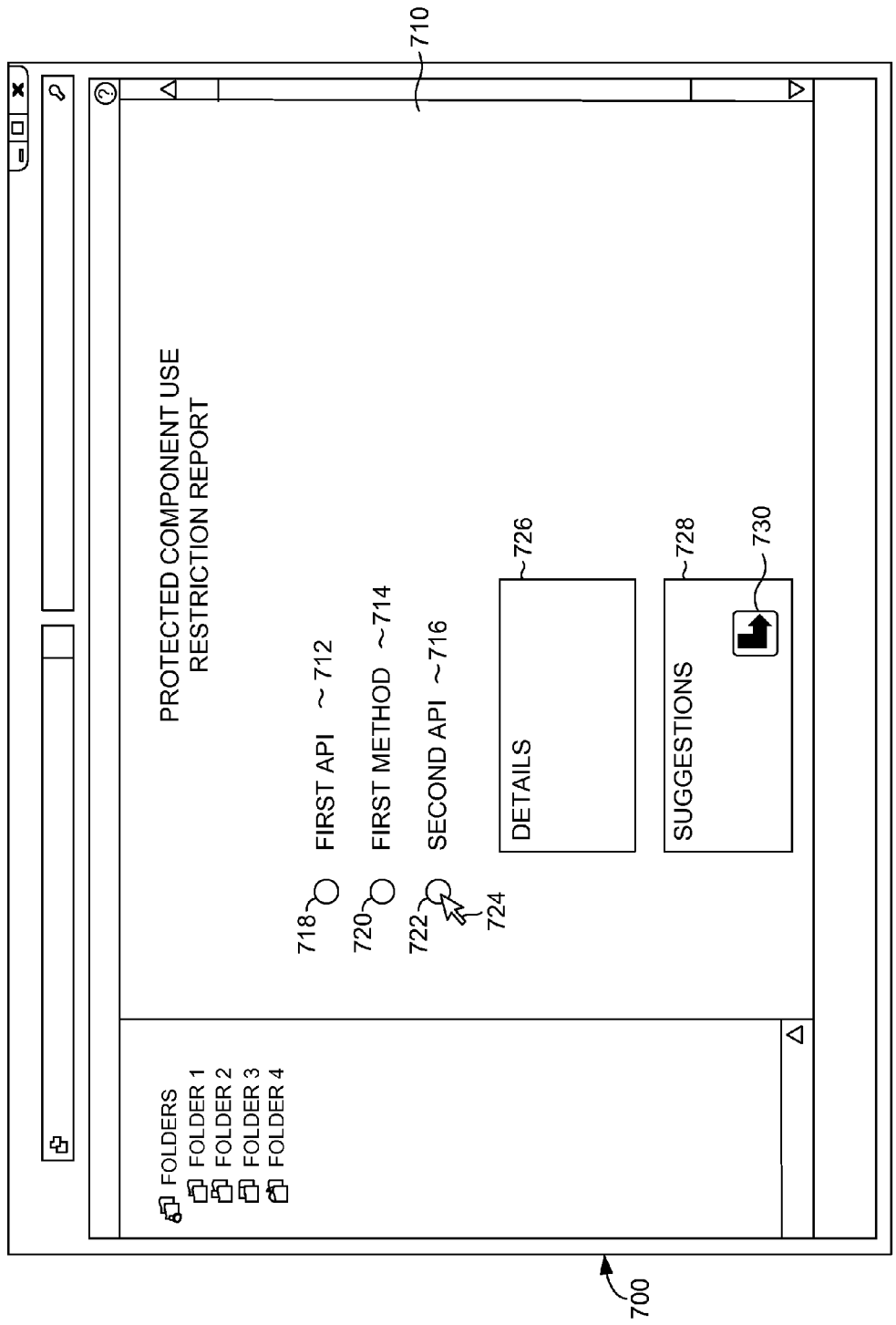
FIG. 7 is another screen shot showing an exemplary usability report in accordance with embodiments of the present invention.

Turning now to FIGS. 5-7, a series of screen shots is shown, which illustrate aspects of an exemplary IDE according to an embodiment of the present invention. Nothing in the illustrations or descriptions herein is intended to limit implementations of the present invention to this illustrative depiction, as it is understood that various implementations of the present invention can be accomplished using a wide variety of user interfaces and applications.

With reference to FIG. 5, an exemplary configuration user interface 500 is shown. The configuration user interface 500 allows a user to configure various settings that may have an effect on the types of user restrictions that will be associated with application components that the user may attempt to invoke. The configuration user interface 500 includes a primary display 510 and a peripheral display 512. The peripheral display 512 can include any number of icons, buttons, folders, and the like. Primary display 510 includes a target device selection region 514, a target network selection region 516, a target application host input region 518, and a target service provider input region 520. According to embodiments of the present invention, any number of other selection or input regions can be included as well. Additionally, in some embodiments, selection and input regions can be distributed over a number of different display pages, according to any number of different configurations, and may be presented in any number of different formats.

The target device selection region 514 illustrated in the exemplary screenshot depicted in FIG. 5 includes a listing of devices 522, 524, 526, 528, and 530 for which protected component information is known (e.g., maintained in a database). Selection boxes 534, 536, 538, and 540 are displayed adjacent to each of the listed devices 522, 524, 526, 528, and 530. Additionally, an "All Devices" listing 532 is included adjacent to a selection box 542.

A user can select a desired target device, for example, by clicking on the corresponding selection box. When a device is selected, an "X" 560 is displayed in the selection box. Alternatively, a user can select "All Devices" 532, and have their code tested against protected components associated with all of the devices in the database. In the illustrative screen shot of FIG. 5, the user has selected second device 524, fourth device 528, and fifth device 530 as target devices. After selecting target devices, the user may configure other settings offered by the IDE or SDK such as, for example, by selecting a target network and entering target application host and target service provider information.

The illustrative target network selection region 516 includes a listing of types of mobile network carriers: CDMA 544, GSM 546, and Wi-Max 548. It should be understood by those having ordinary skill in the relevant art that any number of other types of networks, including sub-types of networks or types of subsystems, and the like, can be included for selection in a target network selection region 516. Selection boxes 550, 552, and 554 are displayed adjacent to each of the listed network types. As with the target device selection region 514, the target network selection region 516 could also include an "All Networks" selection option (not illustrated in FIG. 5). In the illustrative screen shot of FIG. 5, the user has selected GSM 546 network type by causing the placement of an "X" 560 in the adjacent selection box 552.

As further illustrated in FIG. 5, the configuration user interface 500 includes a target application host input region 518 and a target service provider input region 520. Input fields 556 and 558 such as, for example, text boxes, are provided for receiving user input that identifies the requested information. In the illustrative example depicted in FIG. 5, a user can type an identifier in input field 556 that corresponds to a company, website, service, or the like that will likely host, own, use, or otherwise provide the application once it is finished. In some embodiments, input fields 556 and 558 can be configured to receive text strings of various arrangements, alphanumeric codes, and the like. In an embodiment, selectable options can be provided adjacent to input fields 556 and 558 that, when selected by a user, can cause additional information to be displayed such as, for example, mappings between names and identifying codes. Other techniques for receiving user input and processing the input for useful information can be employed in implementations of the configuration settings feature of the present disclosure as well. In embodiments, the user may configure other settings offered by the IDE or SDK, and the user can begin writing source code into a source-code editor, which can be displayed in a user interface such as the exemplary user interface illustrated in FIG. 5.

However, in another embodiment, a user does not need to alter or choose any configuration settings before writing source code. In an embodiment, the system can be configured to automatically assess usability with respect to any number of various combinations of potential configuration settings (e.g., various devices, networks, and the like). In another embodiment, configuration settings may be automatically established based on aspects of the programmatic code as it is written such as, for example, import statements, libraries that the user attaches, certain function calls, code classifications, and the like. These aspects of programmatic code can also be used to determine code classifications in situations such as, for example, when the key word search returns an ambiguous result. In still further embodiments, configuration settings can be established by network operators, or by automatic processes initiated upon authentication of a user.

Turning to FIG. 6, another screen shot is shown that illustrates an exemplary integrated development environment in accordance with an embodiment of the present invention. As illustrated in FIG. 6, the exemplary IDE includes a user interface 600. User interface 600 includes a primary display 610 that displays a source-code editor user interface 612. Source code can be written into the source-code editor user interface 612 and is displayed on the primary display 610, as illustrated in FIG. 6. As discussed above, text searches and/or parsing techniques can be used to identify key words and other aspects of the programmatic code that enable a determination of corresponding code classifications.

For example, as illustrated in FIG. 6, character strings that constitute portions of code designed to invoke methods such as code portion 614 and code portions corresponding to classes such as code portion 616 can be examined to determine whether the code portions correspond to classifications associated with protected components. In an embodiment, a key word 618 can be identified and associated with a code classification. As further illustrated in FIG. 6, a usability indication 620 such as an underscore can be provided within the displayed programmatic code itself. In the illustrated example, another type of usability indication 622 is a box displayed around the key word. In an embodiment, usability indications 620 and 622 can be configured to be displayed in any number of several colors that can be assigned to represent varying types and degrees of usability or use restrictions. Additionally, any number of other types of usability indications can be incorporated within embodiments of the present invention such as, for example, changes to the color of displayed text, images or icons, flashing or blinking text, other types of markers, and the like.

For example, usability indications could be displayed in red to indicate that a code portion corresponds to a protected component that has an associated use restriction requiring payment of a fee to use the component. Additionally, usability indications could be displayed in green to indicate that a particular code portion corresponds to an application component that does not have any associated use restrictions (i.e., an unprotected component), and usability indications could be displayed in orange to indicate an intermediate degree of usability such as where a component can be used for free, but for a limited number of uses. The nature of the display of usability indications as discussed herein is merely illustrative, and it is not intended to limit the configuration of usability indications in various other embodiments of the present invention.

For example, with continued reference to FIG. 6, a usability indication 624 can be provided in a separated viewing area 625, and can, as in the illustrative example of FIG. 6, be arranged adjacent to the corresponding code portion displayed in the primary display 610. In embodiments, usability indications can be displayed in different forms such as indication 626 such that additional information can be conveyed to the user based on the type of indication displayed. In an embodiment of the present invention, source code is analyzed as it is written or portion-by-portion shortly after it is written, and feedback information is provided via window 612, which provides the user with a "real-time" usability analysis.

According to various embodiments of the present invention, usability indications 620, 622, 624, and 626 can include input regions capable of receiving user input such as, for example, a mouse click. Upon receiving user input, further information can be displayed to the user. Such information can include more detailed feedback information that informs the user about the use restrictions associated with the protected component corresponding to the code portion. For example, the additional feedback information can provide instructions to the user for satisfying the use restrictions, information about the consequence of using the protected component without satisfying the restrictions, contact information for support personnel, suggestions of alternative components that can be used instead of the protected components, and the like. In some embodiments, the additional feedback can include links, files, references, pointers, and the like that enable a user to retrieve or access documentation and/or information necessary for satisfying a use restriction. For example, a protected component may include a use restriction that requires a user to apply for the right to use the component. Upon selecting a usability indication presented to the user adjacent a code portion corresponding to that component, the user may be presented with information about the application process, the amount of any required fees, and a hyperlink to an application that the user can fill out and submit online, without ever having to leave the user's workstation.

As illustrated in FIG. 6, usability indications 624 and 626 can be arranged adjacent to lines of programmatic code. In an embodiment, the programmatic code is analyzed one line at a time, and a usability indication 624, 626 is displayed adjacent to the corresponding line of code. In another embodiment, if the user modifies a line of code in response to observing a corresponding usability indication that indicates that the line of code corresponds to a protected component, the modified code can be analyzed and the usability indication can be updated accordingly.

Turning now to FIG. 7, another screen shot is provided, which shows an exemplary usability report 700 in accordance with an embodiment of the present invention. Usability report 700 includes a primary display 710 that includes information relating to the usability of code in relation to a number of protected components. In an embodiment, usability report 700 includes a listing of protected components 712, 714, and 716. Additionally, a usability indication 718, 720, and 722 may be provided. In an embodiment, a usability indication, e.g., usability indication 722, can include a button or other interactive object such that a user can select the object such as, for example, by selecting the indication 722 with a mouse cursor 724.

Among other types of information, selecting usability indication 722 causes additional details regarding the use restrictions associated with the second API 716. In an embodiment, details 726 can include, for example, a listing of use restrictions associated with the component 716, an explanation of use restrictions associated with the component 716, fees associated with the use restrictions, and the like. In an embodiment, suggestions 728 for satisfying use restrictions such that the user can use component 716 can be provided. Suggestions 728 can include instructions for applying for permission to use the component 716, payment instructions, and the like. In one embodiment, a link 730 or other type of reference (e.g., a URL, mailing address, etc.) can be provided for enabling a user to access an application, documentation, or other information associated with use restrictions corresponding to the protected component 716.

Figure 8:
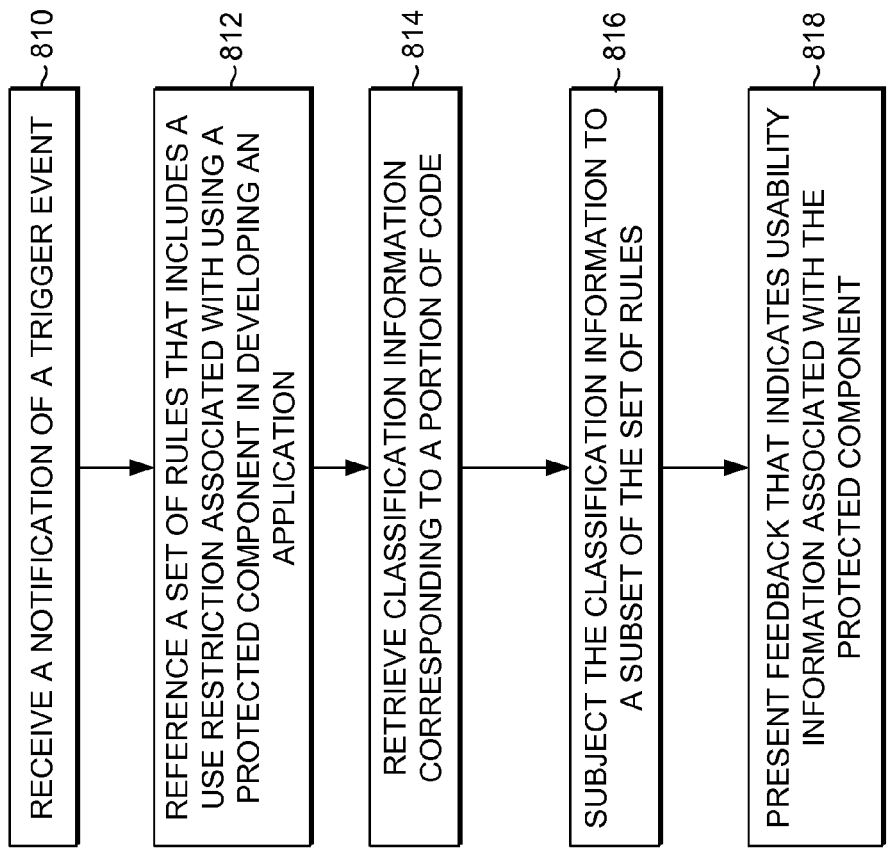
FIG. 8 is a flow diagram showing an illustrative method of facilitating development of an application by a user for a mobile communications device in accordance with embodiments of the present invention.

To recapitulate, we have described systems for providing feedback to a user that indicates information regarding protected components that a user attempts to invoke when developing applications for mobile communications devices. Turning to FIG. 8, a flow diagram is provided, showing an illustrative method of facilitating development of an application by a user for a mobile communications device. At a first illustrative step, step 810, a notification of a trigger event is received. According to various embodiments, a trigger event can be any type of event that results in the referencing of a set of rules that includes use restrictions related to protected application components. For example, a trigger event can be a keystroke corresponding to a final character in a series of characters that make up a portion of source code such as a method associated with a protected API. At step 812, a set of rules is referenced. The set of rules includes use restrictions associated with various protected application components such as libraries, methods, APIs, and the like. In various embodiments, use restrictions can include restrictions based on dynamic business rules defined by a network operator. In other embodiments, use restrictions can include restrictions based on rules associated with characteristics of the user, which may be maintained within a user profile corresponding to the user. According to further embodiments, use restrictions, dynamic business rules, and the like can apply to identified classes of mobile devices, identified types of networks, identified types of subscriptions or accounts held by users, and the like.

At step 814, classification information corresponding to a portion of code is retrieved. In embodiments, the portion of code can be a portion of source code. In other embodiments, the portion of code is a portion of compiled code. In still further embodiments, a portion of code can include the entire body of source code or compiled code making up an application. At step 816, the classification information is subjected to a subset of the set of rules. As the term is used herein, a subset can include either an improper subset (i.e., the entire set of rules) or a proper subset (i.e., some subset of the set of rules that is not equivalent to the entire set of rules). At a final illustrative step 818, feedback is presented that indicates usability information associated with the protected component. In embodiments, presenting feedback information can comprise displaying an indication that the portion of code has an associated use restriction. In some embodiments, the displayed indication can include alterations to the display of the portion of code itself. For example, the color of the portion of code can be altered, the portion of code can be highlighted or underlined, a box can be displayed around the portion of code, and the like. In other embodiments, visual cues such as buttons, lights, markers, icons, and the like can be displayed near the portion of code.

Figure 9:
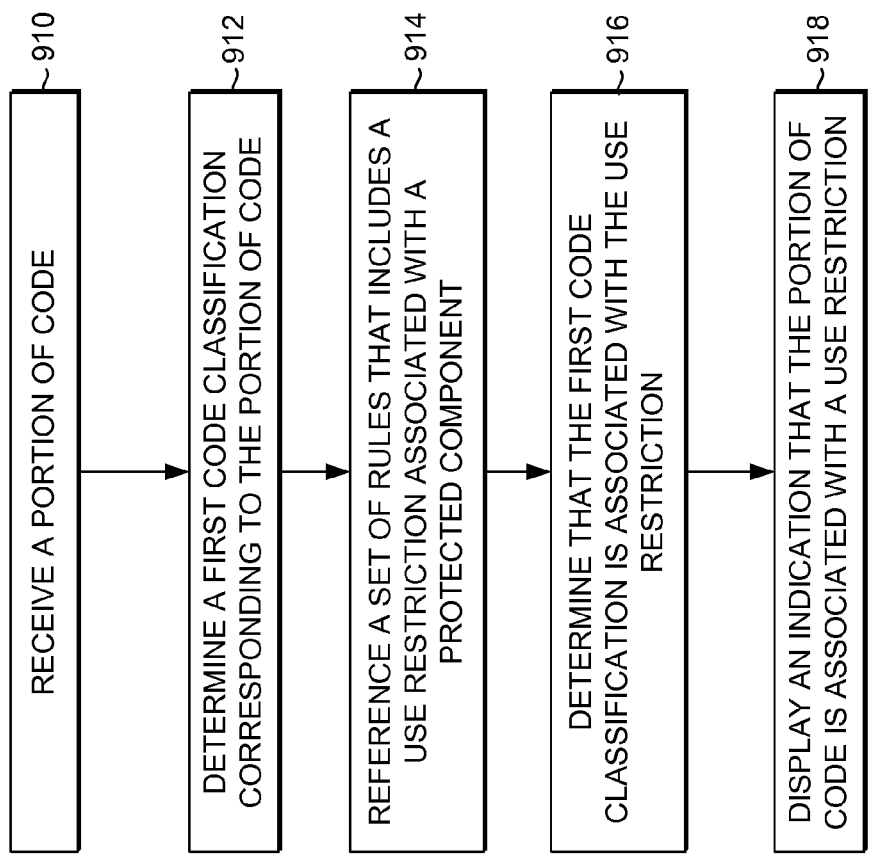
FIG. 9 is a flow diagram showing another illustrative method of facilitating development of an application by a user for a mobile communications device in accordance with embodiments of the present invention.

Turning now to FIG. 9, a flow diagram showing another illustrative method of facilitating development of an application by a user for a mobile communications device. At a first illustrative step 910, a portion of code is received. The portion of code consists of programmatic code extracted from an IDE and can, according to various embodiments, include source code, compiled code, bytecode, and the like. At step 912, a first code classification corresponding to the portion of code is determined and, as shown at illustrative step 914, a set of rules is referenced. The set of rules includes a use restriction or restrictions associated with using a protected component or components in developing applications for mobile communications devices. In one embodiment, the use restriction can include a requirement for obtaining permission from a network operator to use a protected component. In another embodiment, the use restriction includes a rule specifying that a protected component is only available for use in developing an application if the application will be distributed by the network operator. In other embodiments, use restrictions can include costs associated with using a protected component. In some embodiments, such costs are assessed against the user who is developing the application, and in other embodiments, the costs are assessed against consumers that utilize the applications.

With continued reference to FIG. 9, at step 916 a determination is made as to whether the first code classification is associated with a use restriction included in the set of rules. In some embodiments, for example, a first code classification might be a particular API, whereas a second code classification corresponding to the same portion of code may be a method associated with that API. In an embodiment, the API itself might not be protected, but the method may be. In that case, embodiments of the present invention allow for identifying both code classifications and determining the appropriate use restrictions corresponding thereto. At a final illustrative step 918, an indication that the portion of code is associated with a use restriction is presented on a display device.

Figure 10:
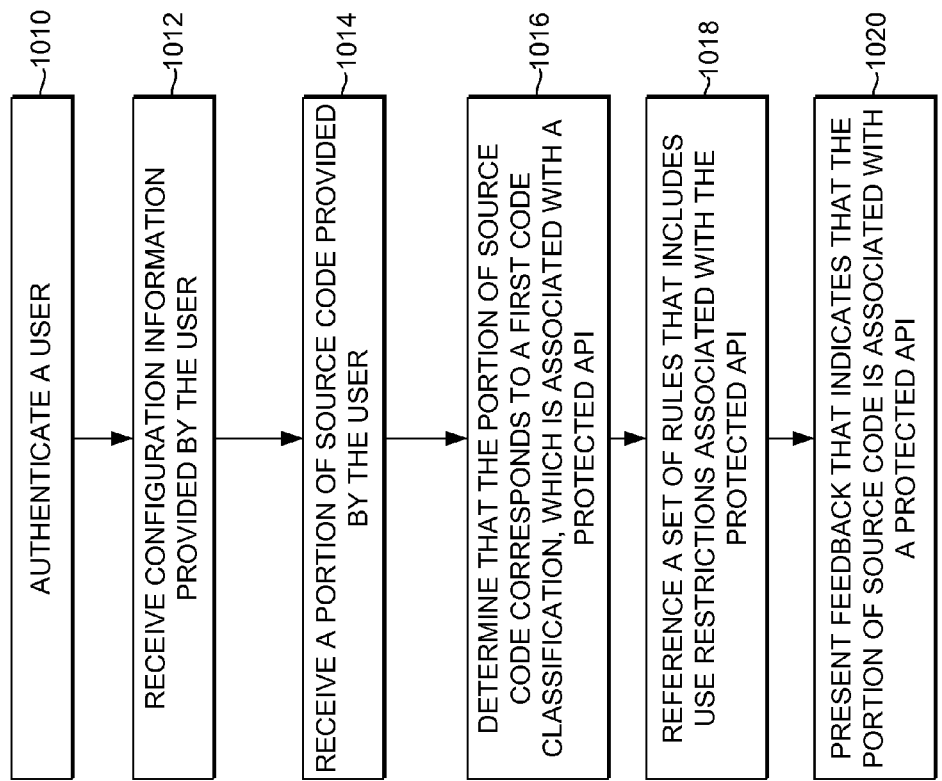
FIG. 10 is a flow diagram showing another illustrative method of facilitating development of an application by a user for a mobile communications device in accordance with embodiments of the present invention.

FIG. 10 is a flow diagram showing another illustrative method of facilitating development of an application by a user for a mobile communications device. At a first illustrative step 1010, a user is authenticated. In an embodiment, for example, authentication includes verifying an identification of the user and referencing a user profile associated with the user. In some embodiments, a user may be authenticated by way of a log in process, during which a user enters a login name and a password. In other embodiments, a user may be identified simply by an address associated with the user that is detected by the support service such as, for example, an internet protocol (IP) address, a machine address (MAC), or the like.

As shown at step 1012, configuration information is received. The configuration information is provided by the user. In some embodiments, the configuration information can be provided by the user at some initial time, and then during subsequent authentications, the configuration information may be automatically retrieved from the user's profile. Accordingly, it should be readily apparent to those having ordinary skill in the relevant art that the steps of the illustrative method depicted in FIG. 10 need not necessarily be performed in any particular order. According to embodiments, the configuration information can include information about the user, demographic information, an identification of one or more target mobile communications devices, an identification of one or more target networks, an identification of one or more target application hosts (the entity that hosts the finished and commercialized application), an identification of a target mode of distribution, and the like.

With continued reference to FIG. 10, at step 1014, a portion of source code provided by the user is received. According to an embodiment of the present invention, the portion of source code includes one or more lines of source code extracted from a source-code editor. In another embodiment, the portion of source code may actually be an entire body of source code that comprises an application. As illustrated at step 1016, the illustrative method further includes determining that the portion of source code corresponds to a first code classification. The first code classification is associated with a protected API. In an embodiment, the first code classification is determined by parsing the portion of source code to identify a key word. In another embodiment, a text search engine (TSE) can be run on the code to identify key words.

At step 1018, a set of rules is referenced. The set of rules includes a number of use restrictions associated with the protected API. In embodiments, the set of rules can include use restrictions associated with additional protected components, as well. Additionally, according to various embodiments of the invention, the use restrictions that are discovered while referencing the set of rules can include restrictions that are based on various attributes associated with the configuration information. In a final illustrative step, step 1020, feedback is presented that indicates that the portion of source code is associated with a protected API. The feedback can be displayed on a display device, presented as audio, or the like. In embodiments, a visual indication can be displayed that indicates that the source code is associated with a protected API. In some embodiments, the visual indication has an associated input region that is configured to receive user input. Furthermore, the input region can include a selectable option for displaying information about the use restriction. In various embodiments, incident to receiving user input, various types of information can be displayed to the user such as, for example, a description of the use restriction, an explanation of the consequences of using the protected API, and in some embodiments, information about how the user can satisfy the use restriction such that the user can use the protected API in developing the application.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon for performing a method of facilitating development of an application by a user for a mobile communications device, the method comprising:
receiving a notification of an occurrence of a trigger event, wherein the trigger event comprises completion of entering a portion of code into a development environment, wherein the portion of code comprises an attempted invocation of a protected component;
upon receiving the notification of the occurrence of the trigger event, referencing a plurality of use restrictions associated with a plurality of protected components;
determining, for the portion of code in the application, a code classification associated with a use restriction in the plurality of use restrictions;
based on the use restriction, matching the protected component from the plurality of protected components to the portion of code with the code classification; and
presenting, on a display device, feedback associated with the protected component invoked by the portion of code, wherein the feedback indicates usability information for the protected component;
wherein presenting feedback comprises displaying an indication, the indication comprising at least one of an alteration to the color of the portion of code that is displayed to the user, an underlining of the portion of code that is displayed to the user, and a visual cue displayed near the portion of code that is displayed to the user.

2. The media of claim 1, wherein the trigger event comprises a keystroke corresponding to a final character in a series of characters that comprise the portion of code.

3. The media of claim 1, wherein the portion of code comprises programmatic code extracted from an integrated development environment.

4. The media of claim 1, wherein the protected component comprises an application programming interface (API).

5. The media of claim 1, wherein the protected component comprises at least one of a first method associated with an API and a protected parameter corresponding to a second method associated with an API.

6. The media of claim 1, wherein the use restriction is based on at least one dynamic business rule defined by a network operator.

7. The media of claim 1, wherein the use restriction is based on at least one rule associated with a characteristic of the user, the characteristic of the user being represented in a user profile corresponding to the user.

8. The media of claim 1, wherein presenting feedback comprises displaying a visual indication that the source code is associated with a protected application programming interface (API), the visual indication having an associated input region that is configured to receive user input and a selectable option for displaying information about the use restriction incident to receiving user input by way of the input region, wherein said information comprises a description of the use restriction.

9. The media of claim 1, wherein usability information comprises an indication that the portion of code has an associated use restriction.

10. The media of claim 9, wherein usability information further comprises instructions for satisfying the use restriction such that the portion of code can be used in development of the application.

11. A computer-implemented method of facilitating development of an application by a user for a mobile communications device, the method comprising:
   receiving a notification of an occurrence of a trigger event, wherein the trigger event comprises completion of entering a portion of code into a development environment, wherein the portion of code comprises an attempted invocation of a protected component;
   upon receiving the notification of the occurrence of the trigger event, referencing a plurality of use restrictions associated with a plurality of protected components;
   determining, for the portion of code in the application, a code classification associated with a use restriction in the plurality of use restrictions;
   based on the use restriction, matching the protected component from the plurality of protected components to the portion of code with the code classification; and
   presenting, on a display device, feedback associated with the protected component invoked by the portion of code, wherein the feedback indicates usability information for the protected component;
   wherein presenting feedback comprises displaying an indication, the indication comprising at least one of an alteration to the color of the portion of code that is displayed to the user, an underlining of the portion of code that is displayed to the user, and a visual cue displayed near the portion of code that is displayed to the user.

12. The method of claim 11, wherein the trigger event comprises a keystroke corresponding to a final character in a series of characters that comprise the portion of code.

13. The method of claim 11, wherein the protected component comprises an application programming interface (API), wherein the protected component comprises at least one of a first method associated with an API and a protected parameter corresponding to a second method associated with an API.

14. The method of claim 11, wherein the use restriction comprises a rule specifying that the protected component is only available for use in developing the application if the application will be distributed by the network operator.

15. The method of claim 11, wherein the use restriction comprises a cost associated with using the protected component.

16. The method of claim 15, wherein if the protected component is used in developing the application, the cost is assessed against a customer, incident to the customer's use of the application via a mobile device.

17. The method of claim 11, wherein presenting feedback comprises displaying a visual indication that the source code is associated with a protected application programming interface (API), the visual indication having an associated input region that is configured to receive user input.

18. The method of claim 11, wherein the visual indication further comprises a selectable option for displaying information about the use restriction incident to receiving user input by way of the input region, wherein said information comprises a description of the use restriction.

19. The media of claim 11, wherein the portion of code comprises programmatic code extracted from an integrated development environment.

20. A system for facilitating development of an application by a user for a mobile communications device, the system comprising:
   a computing device programmed to:
   receive a notification of an occurrence of a trigger event, wherein the trigger event comprises completion of entering a portion of code into a development environment, wherein the portion of code comprises an attempted invocation of a protected component;
   upon receiving the notification of the occurrence of the trigger event, reference a plurality of use restrictions associated with a plurality of protected components;
   determine, for the portion of code in the application, a code classification associated with a use restriction in the plurality of use restrictions;
   based on the use restriction, match the protected component from the plurality of protected components to the portion of code with the code classification; and
   present, on a display device, feedback associated with the protected component invoked by the portion of code, wherein the feedback indicates usability information for the protected component;
   wherein presenting feedback comprises displaying an indication, the indication comprising at least one of an alteration to the color of the portion of code that is displayed to the user, an underlining of the portion of code that is displayed to the user, and a visual cue displayed near the portion of code that is displayed to the user.

* * * * *